United States Patent
Lim et al.

(10) Patent No.: US 11,347,134 B2
(45) Date of Patent: May 31, 2022

(54) CAMERA MODULE

(71) Applicant: SAMSUNG ELECTRO-MECHANICS CO., LTD., Suwon-si (KR)

(72) Inventors: Soo Cheol Lim, Suwon-si (KR); Byung Woo Kang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 431 days.

(21) Appl. No.: 16/411,571

(22) Filed: May 14, 2019

(65) Prior Publication Data

US 2020/0050084 A1 Feb. 13, 2020

(30) Foreign Application Priority Data

Aug. 9, 2018 (KR) .................. 10-2018-0093062

(51) Int. Cl.
*G03B 13/34* (2021.01)
*G02B 7/04* (2021.01)
*H02K 41/035* (2006.01)

(52) U.S. Cl.
CPC .............. *G03B 13/34* (2013.01); *G02B 7/04* (2013.01); *H02K 41/0354* (2013.01)

(58) Field of Classification Search
CPC .................................. G03B 13/34; G02B 7/04
USPC .................................................. 359/820, 823
See application file for complete search history.

(56) References Cited

U.S. PATENT DOCUMENTS

| 6,064,827 A * | 5/2000 | Toyoda ............... G02B 27/646 396/55 |
| 9,794,459 B1 * | 10/2017 | Kim ..................... H04M 1/0264 |
| 9,807,312 B1 * | 10/2017 | Kim ..................... H04N 5/2253 |
| 2005/0219718 A1 | 10/2005 | Umezu et al. |
| 2006/0193067 A1 * | 8/2006 | Kim ..................... G02B 26/105 359/872 |

(Continued)

FOREIGN PATENT DOCUMENTS

| CN | 1677155 A | 10/2005 |
| CN | 201322820 Y | 10/2009 |

(Continued)

OTHER PUBLICATIONS

Chinese Office Action dated Nov. 30, 2020 issued in the corresponding Chinese Patent Application No. 201910724758.2.(4 pages in English) (7 pages in Chinese).

*Primary Examiner* — James R Greece
(74) *Attorney, Agent, or Firm* — NSIP Law (57) ABSTRACT

A camera module includes a housing accommodating a lens module; a driving unit including a magnet disposed on the lens module and a coil disposed to face the magnet; a yoke to generate attractive force with the magnet; a first ball member disposed between the lens module and the housing, and pressed by a first pressing force; and a second ball member disposed between the lens module and the housing, and pressed by a second pressing force. A direction of the first pressing force is different than a direction of the second pressing force, and a point of action of a resultant force of the first pressing force and the second pressing force is located closer to one of the first ball member and the second ball member than the other of the first ball member and the second ball member.

20 Claims, 6 Drawing Sheets

(56) References Cited

U.S. PATENT DOCUMENTS

| | | | |
|---|---|---|---|
| 2008/0181594 A1* | 7/2008 | Noguchi | G03B 17/00 |
| | | | 396/55 |
| 2009/0303594 A1 | 12/2009 | Lim et al. | |
| 2011/0063741 A1 | 3/2011 | Park et al. | |
| 2014/0362284 A1 | 12/2014 | Shin et al. | |
| 2015/0049209 A1* | 2/2015 | Hwang | G02B 7/09 |
| | | | 348/208.11 |
| 2015/0296112 A1* | 10/2015 | Park | G03B 5/00 |
| | | | 348/208.7 |
| 2015/0296143 A1* | 10/2015 | Kang | G03B 3/10 |
| | | | 348/208.11 |
| 2015/0373272 A1* | 12/2015 | Lim | H04N 5/2254 |
| | | | 348/208.11 |
| 2016/0154204 A1* | 6/2016 | Lim | G02B 27/646 |
| | | | 359/557 |
| 2016/0252702 A1 | 9/2016 | Tsuchiya et al. | |
| 2016/0299349 A1* | 10/2016 | Cho | G03B 5/02 |
| 2017/0139225 A1* | 5/2017 | Lim | G02B 7/08 |
| 2017/0205600 A1* | 7/2017 | Kim | G02B 7/023 |
| 2017/0261720 A1 | 9/2017 | Kang et al. | |
| 2017/0357077 A1 | 12/2017 | Kim et al. | |
| 2018/0067336 A1* | 3/2018 | Izumi | H04N 5/2328 |
| 2018/0115715 A1* | 4/2018 | Jung | H04N 5/23287 |
| 2018/0173081 A1 | 6/2018 | Kim et al. | |
| 2020/0050083 A1 | 2/2020 | Jeong et al. | |

FOREIGN PATENT DOCUMENTS

| | | |
|---|---|---|
| CN | 102023364 A | 4/2011 |
| CN | 104238238 A | 12/2014 |
| CN | 105589278 A | 5/2016 |
| CN | 105929517 A | 9/2016 |
| CN | 106054494 A | 10/2016 |
| CN | 205880330 U | 1/2017 |
| CN | 107490920 A | 12/2017 |
| CN | 207636905 U | 7/2018 |
| CN | 207665078 U | 7/2018 |
| CN | 110824814 A | 2/2020 |
| KR | 10-2011-0009779 A | 1/2011 |
| KR | 10-1308621 B1 | 9/2013 |
| KR | 10-1406016 B1 | 6/2014 |
| KR | 10-1653247 B1 | 9/2016 |
| KR | 10-2018-0063404 A | 6/2018 |
| WO | WO 2013/118503 A1 | 8/2013 |
| WO | WO 2015/133731 A1 | 9/2015 |

\* cited by examiner

CAMERA MODULE

CROSS-REFERENCE TO RELATED APPLICATION

This application claims the benefit of 35 U.S.C. § 119(a) of Korean Patent Application No. 10-2018-0093062 filed on Aug. 9, 2018 in the Korean Intellectual Property Office, the entire disclosure of which is incorporated herein by reference for all purposes.

BACKGROUND

1. Field

The following description relates to a camera module.

2. Description of Background

Camera modules have been used in mobile communications terminals such as smartphones, tablet PCs, notebook computers, and the like. Such camera modules have a focus adjustment function for generating high-resolution images.

When the focus is adjusted, a lens module is moved in an optical axis direction by an actuator. When the lens module is moved, a plurality of ball bearings and the like may be used to support the movement of the lens module in the optical axis direction. The plurality of ball bearings contact the lens module and roll in the optical axis direction to support the lens module.

The plurality of ball bearings need to contact and support the lens module. However, it may be significantly difficult to make the sizes of the plurality of ball bearings exactly the same in a manufacturing process. Thus, the sizes of the plurality of ball bearings may be different from each other.

In the case in which there is a slight difference in the size of the plurality of ball bearings, only portions of the ball bearings may come in contact with the lens module, which may cause tilt when the lens module is moved in the optical axis direction.

Furthermore, in a process in which the lens module is moved in an optical axis direction, the ball bearings contacting the lens module may be changed, thereby causing a continuous tilt phenomenon in which the lens module tilts.

Further, since the size difference between the plurality of ball bearings is difficult to visually determine, there is a problem in that it is difficult to predict which of the plurality of balls will contact the lens module.

Moving a lens module in parallel in an optical axis direction may be very important in focus adjustment. Therefore, it is necessary to prevent tilt from occurring when the lens module moves.

The size of a camera module used in a mobile communications terminal has gradually been reduced. As the size of the camera module has been reduced, the problem of resolution degradation due to lens module tilt has increased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module is provided in which tilt may be prevented from occurring when a lens module is moved in an optical axis direction.

In another general aspect, a camera module includes a housing accommodating a lens module; a driving unit including a magnet disposed on the lens module and a coil disposed to face the magnet; a yoke to generate attractive force with the magnet; a first ball member disposed between the lens module and the housing, and pressed by a first pressing force as a result of the attractive force; and a second ball member disposed between the lens module and the housing, and pressed by a second pressing force as a result of the attractive force. A direction of the first pressing force is different than a direction of the second pressing force, and a point of action of a resultant force of the first pressing force and the second pressing force is located closer to one of the first ball member and the second ball member than the other of the first ball member and the second ball member.

A shortest distance between the first ball member and the magnet may be different than a shortest distance between the second ball member and the magnet.

The lens module may include a lens barrel including a lens and a carrier receiving the lens barrel, and a shortest distance between the first ball member and the second ball member may be greater than a maximum diameter of the lens barrel.

The first ball member may include first balls disposed in an optical axis direction and the second ball member may include second balls disposed in the optical axis direction, at least two of the first balls may have differing sizes, and at least two of the second balls may have differing sizes.

An uppermost ball and a lowermost ball in the optical axis direction, among the first balls, may be greater in size than at least one ball located between the uppermost ball and the lowermost ball.

The first ball member may include first balls disposed in an optical axis direction and the second ball member may include second balls disposed in the optical axis direction, an uppermost ball and a lowermost ball in the optical axis direction, among the first balls, may be greater in size than at least one ball located between the uppermost ball and the lowermost ball, and the second balls may have sizes corresponding to each other.

A number of the first balls may be greater than a number of the second balls.

The first ball member may be disposed closer to the magnet than the second ball member, and the point of action of the resultant force may be located closer to the first ball member than the second ball member.

The housing may include a first receiving groove and a second receiving groove, the lens module may include a third receiving groove and a fourth receiving groove, the first ball member may be disposed between the first receiving groove and the third receiving groove, the second ball member may be disposed between the second receiving groove and the fourth receiving groove, and a direction, in which a center of the first receiving groove and a center of the third receiving groove face each other, may be inclined with respect to a direction in which the magnet and the yoke face each other, when viewed in an optical axis direction.

The housing may include first and second guide protrusions protruding toward the lens module, the lens module may include first and second guide grooves into which the first and second guide protrusions are respectively inserted, the first receiving groove and the third receiving groove may be respectively provided in surfaces of the first guide protrusion and the first guide groove facing each other, and the second receiving groove and the fourth receiving groove may be respectively provided in surfaces of the second guide protrusion and the second guide groove facing each other.

In another general aspect, a camera module includes a housing accommodating a lens module; a driving unit including a magnet disposed on the lens module and a coil disposed to face the magnet; a yoke to generate attractive force with the magnet; a first ball member disposed between the lens module and the housing, and pressed by the attractive force; and a second ball member disposed between the lens module and the housing, and pressed by the attractive force. The first ball member is closer to the magnet than the second ball member, and the first ball member and the second ball member are disposed in such a manner that a line connecting a center of the first ball member and a center of the second ball member has an acute angle with respect to the magnet.

A direction of a pressing force applied to the first ball member may be different than a direction of a pressing force applied to the second ball member.

At least one of the direction of the pressing force applied to the first ball member and the direction of the pressing force applied to the second ball member may be different than a direction of the attractive force generated between the magnet and the yoke.

A point of action of a resultant force of the pressing forces applied to the first ball member and the second ball member may be located closer to the first ball member than the second ball member.

The pressing force applied to the first ball member may be greater than the pressing force applied to the second ball member.

The first ball member may include first balls disposed in an optical axis direction and the second ball member may include second balls disposed in the optical axis direction, an uppermost ball and a lowermost ball in the optical axis direction, among the first balls, may be greater in size than at least one ball located between the uppermost ball and the lowermost ball, the second balls may have sizes corresponding to each other, and a number of the first balls may be greater than a number of the second balls.

The first ball member may be in two-point contact with the first receiving groove and the third receiving groove, and the second ball member may be in two-point contact with the second receiving groove and may be in one-point contact with the fourth receiving groove.

The direction of the first pressing force may be perpendicular to the direction of the second pressing force.

The first ball member may be disposed adjacent a first corner of the housing and the second ball member may be disposed adjacent to a second corner of the housing that is diagonal to the first corner.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after gaining an understanding of the disclosure of this application, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. As used herein, the term "and/or" includes any one and any combination of any two or more of the associated listed items. The articles "a," "an," and "the" are intended to include the plural forms as well, unless the context clearly indicates otherwise.

The use of the term "may" with respect to an example or embodiment, e.g., as to what an example or embodiment may include or implement, means that at least one example or embodiment exists in which such a feature is included or implemented while all examples and embodiments are not limited thereto.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section, and vice versa, without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower," relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

Due to manufacturing techniques and/or tolerances, variations of the shapes shown in the drawings may occur. Thus, the examples described herein are not limited to the specific shapes shown in the drawings, but include changes in shape that occur during manufacturing.

A camera module according to and the discussed examples may be applied to portable electronic devices such as a mobile communications terminal, a smartphone, a tablet PC, or the like.

Figure 1:
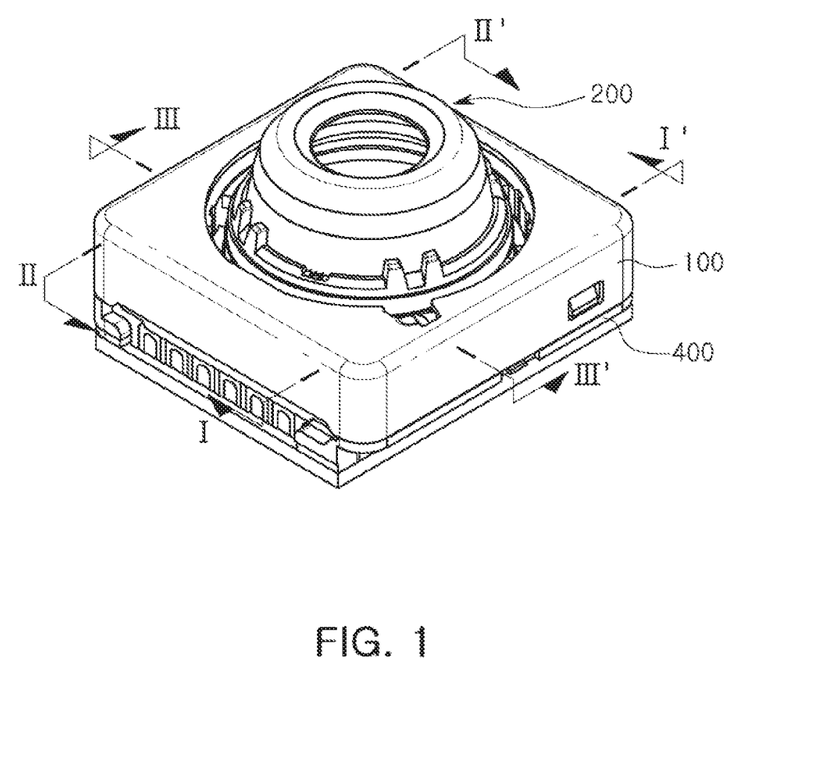
FIG. 1 is a perspective view illustrating an example of a camera module.
Figure 2:
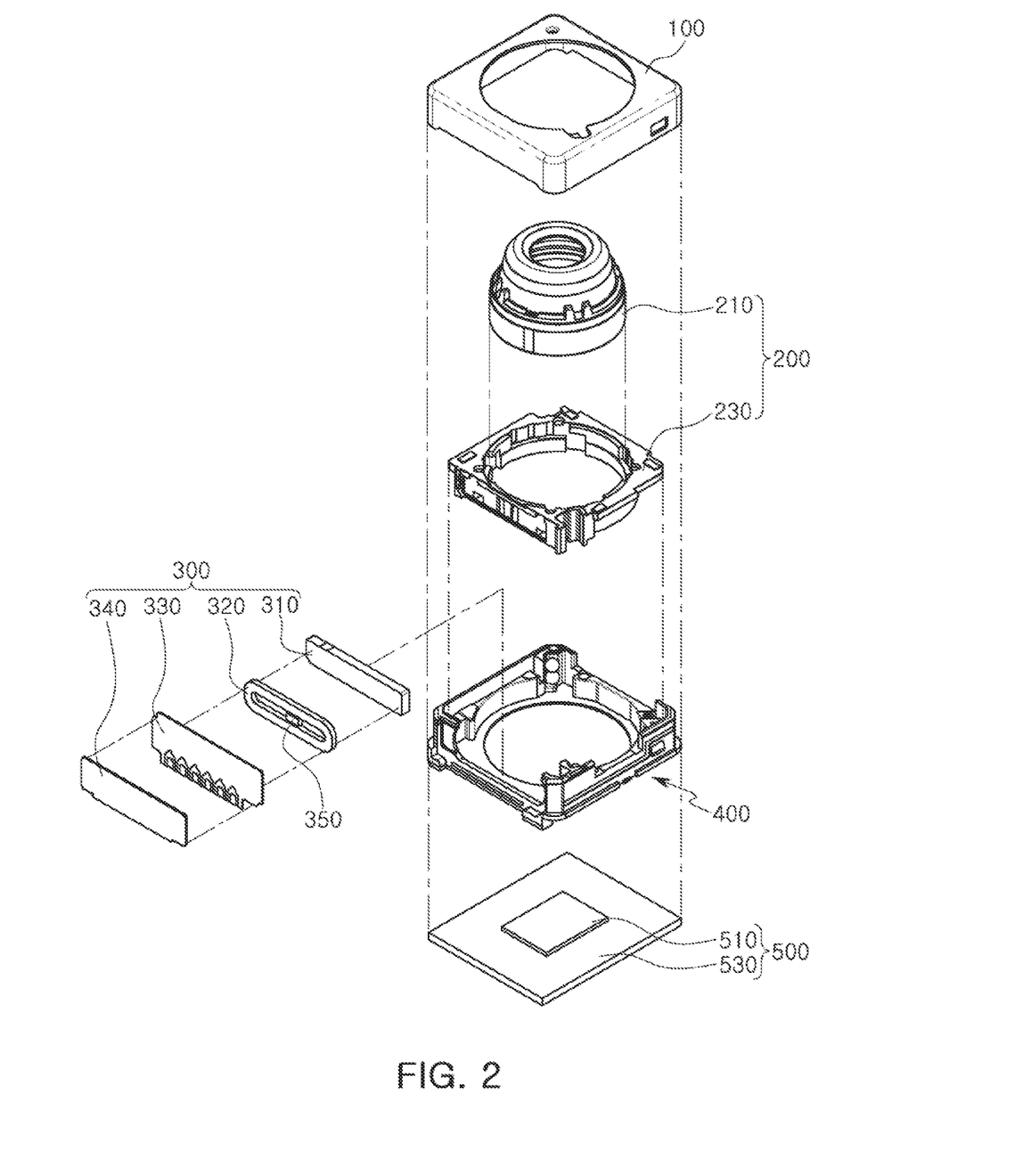
FIG. 2 is a schematic exploded perspective view illustrating an example of a camera module.

FIG. 1 is a perspective view of an example of a camera module, and FIG. 2 is a schematic exploded perspective view of a camera module according to an example.

Referring to FIGS. 1 and 2, a camera module includes a lens module 200, a driving unit 300 moving the lens module 200, an image sensor module 500 converting light incident through the lens module 200 into an electrical signal, and a housing 400 and a case 100 housing the lens module 200.

The lens module 200 includes a lens barrel 210 and a carrier 230.

The lens barrel 210 may receive at least one lens capturing an object. When a plurality of lenses are disposed, the plurality of lenses are mounted inside the lens barrel 210 along an optical axis. The lens barrel 210 may have a hollow cylindrical shape.

The lens barrel 210 is coupled to the carrier 230, and the lens barrel 210 and the carrier 230 are housed in the housing 400 and the case 100. The case 100 is coupled to the housing 400 to surround an outer surface of the housing 400.

The lens barrel 210 is configured to be movable together with the carrier 230 in the direction of an optical axis.

For example, the lens module 200 may be moved in the optical axis direction to adjust a focus, and the driving unit 300 is provided to move the lens module 200.

The image sensor module 500 is disposed below the housing 400. The image sensor module 500 converts light incident through the lens module 200 into an electric signal.

The image sensor module 500 may include an image sensor 510, and a printed circuit board 530 connected to the image sensor 510, and may further include an infrared filter.

The infrared filter functions to block light in an infrared region, in the light incident through the lens module 200.

The image sensor 510 converts the light incident through the lens barrel 210 into an electric signal. In an example, the image sensor 510 may be a charge coupled device (CCD) or a complementary metal-oxide semiconductor (CMOS).

The electric signal converted by the image sensor 510 is output as an image through a display unit of a portable electronic device.

The image sensor 510 is fixed to the printed circuit board 530, and is electrically connected to the printed circuit board 530 by wire bonding.

The driving unit 300 includes a magnet 310 and a coil 320. The magnet 310 may be provided in the lens module 200, and the coil 320 may be disposed to face the magnet 310.

In an example, the magnet 310 may be mounted on one surface of the carrier 230, and the coil 320 may be provided on one surface of a substrate 330 mounted in the housing 400. The magnet 310 and the coil 320 may be disposed to face each other in a direction perpendicular to the optical axis direction.

When power is applied to the coil 320, the carrier 230 may be moved in the optical axis direction by an electromagnetic influence between the magnet 310 and the coil 320.

Since the lens barrel 210 is mounted in the carrier 230, the lens barrel 210 is also moved in the optical axis direction by movement of the carrier 230.

Figure 3:
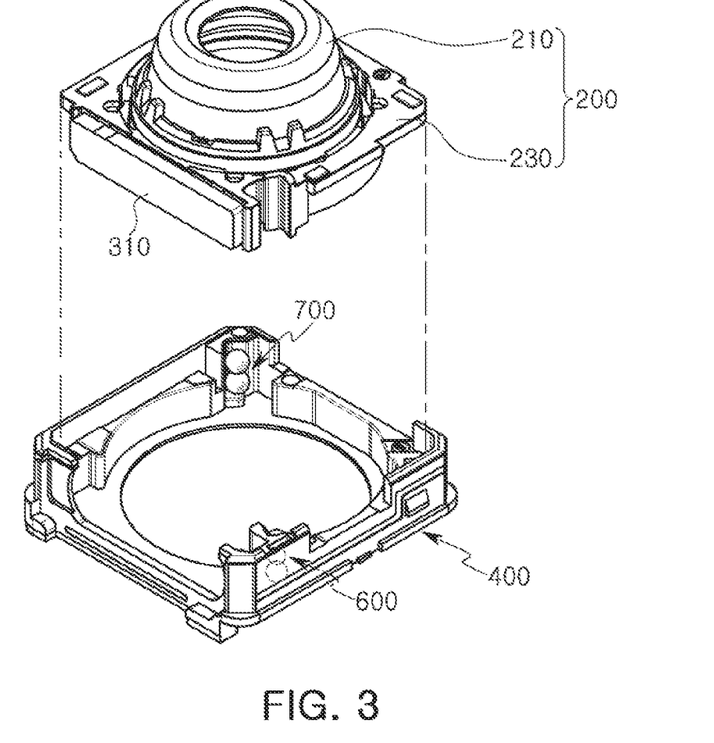
FIG. 3 is a schematic exploded perspective view illustrating an example of a lens module and a housing of a camera module.

Referring to FIG. 3, a first ball member 600 and a second ball member 700 may be disposed between the lens module 200 and the housing 400, to reduce friction between the lens module 200 and the housing 400, when the lens module 200 is moved in the optical axis direction.

In an example, a closed loop control method of detecting and feeding back a position of the lens module 200 is used.

Thus, a position detector 350 is provided for closed loop control. The position detector 350 may be a Hall sensor, and may be disposed in a central portion of the coil 320. The position detector 350 may be formed integrally with a driver IC, applying power to the coil 320.

A yoke 340 is disposed on the other surface of the substrate 330. Thus, the yoke 340 is disposed to face the magnet 310 in a direction perpendicular to the optical axis direction, with the coil 320 interposed between the yoke 340 and the magnet 310.

The yoke 340 is formed of a material capable of generating attraction between the yoke 340 and the magnet 310, such that attraction may be exerted between the yoke 340 and the magnet 310 in a direction perpendicular to the optical axis direction.

The first ball member 600 and the second ball member 700 are pressed by the attractive force between the yoke 340 and the magnet 310, in such a manner that the first ball member 600 and the second ball member 700 may maintain contact thereof with the lens module 200 and the housing 400.

Figure 4:
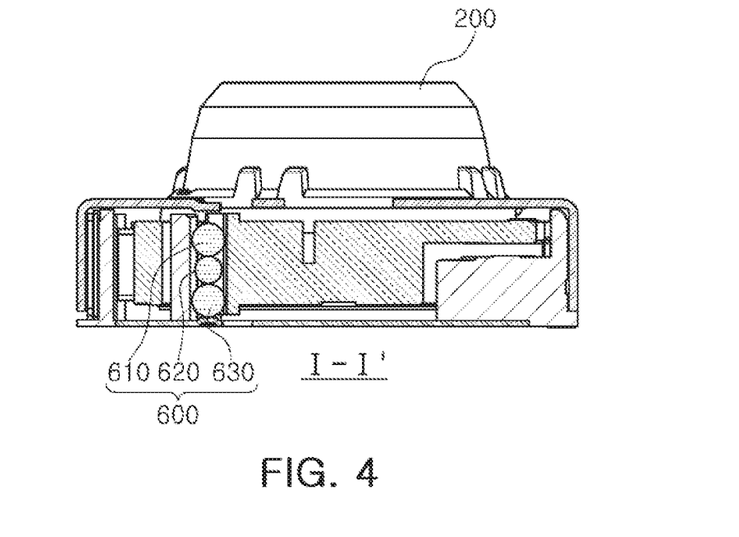
FIG. 4 is a cross-sectional view taken along line I-I' of FIG. 1.
Figure 5:
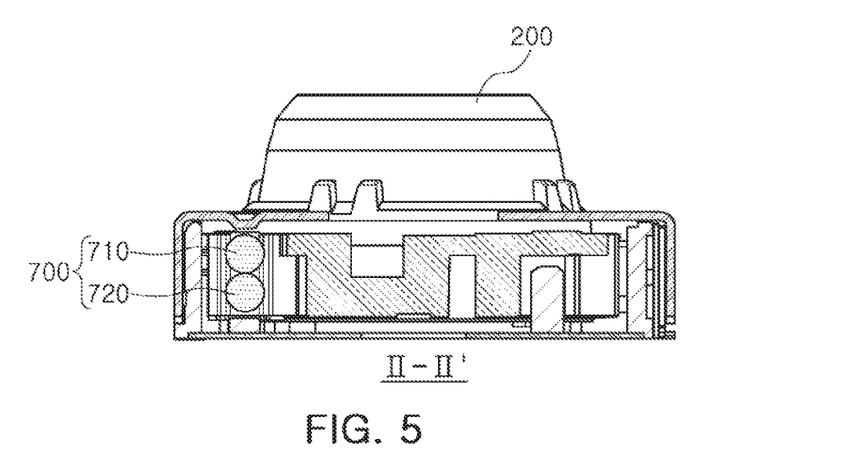
FIG. 5 is a cross-sectional view taken along line II-II' of FIG. 1.

FIG. 3 is a schematic exploded perspective view illustrating an example of a lens module and a housing of a camera module. FIG. 4 is a cross-sectional view taken along line I-I' of FIG. 1 and FIG. 5 is a cross-sectional view taken along line II-II' of FIG. 1.

Figure 6:
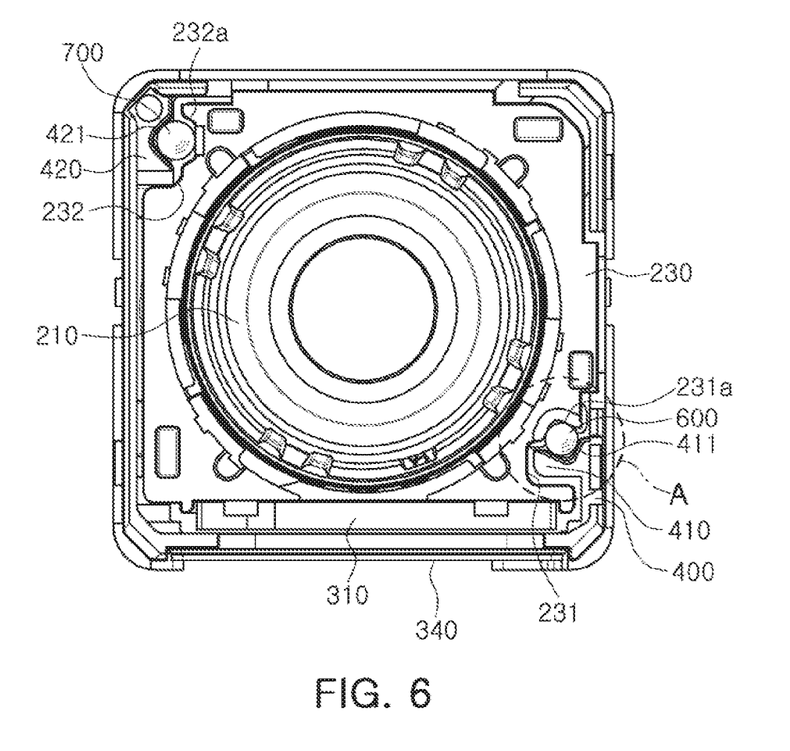
FIG. 6 is a schematic plan view illustrating an example of a camera module when viewed in an optical axis direction.
Figure 7:
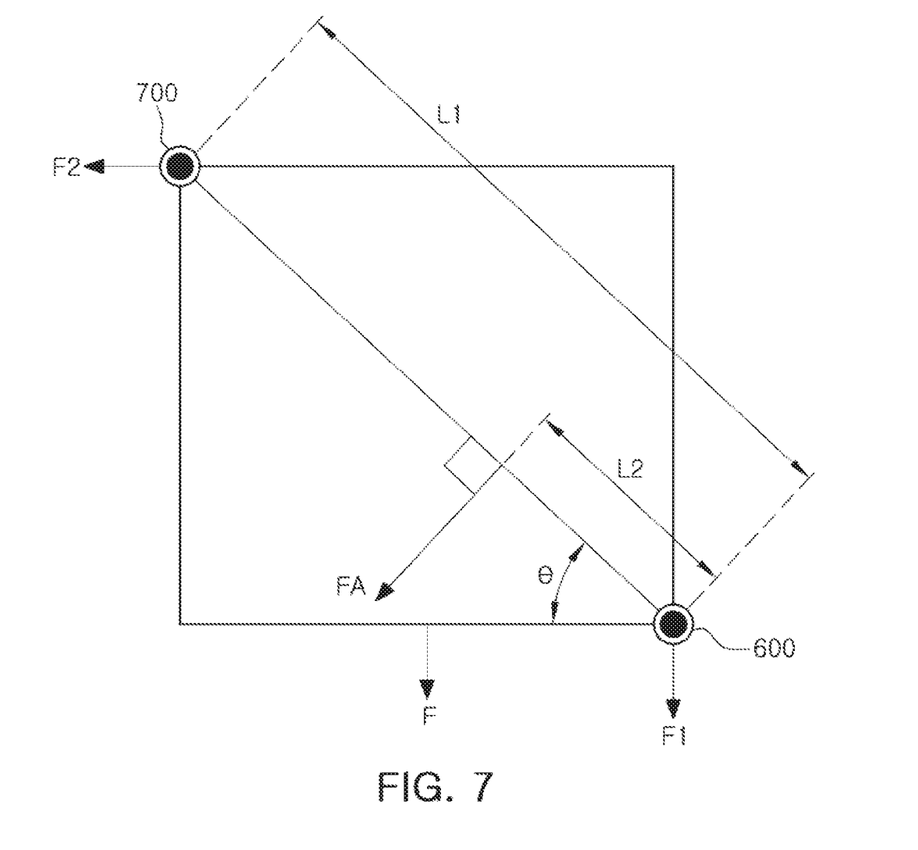
FIG. 7 is a view illustrating pressing force applied to a first ball member and a second ball member.
Figure 8:
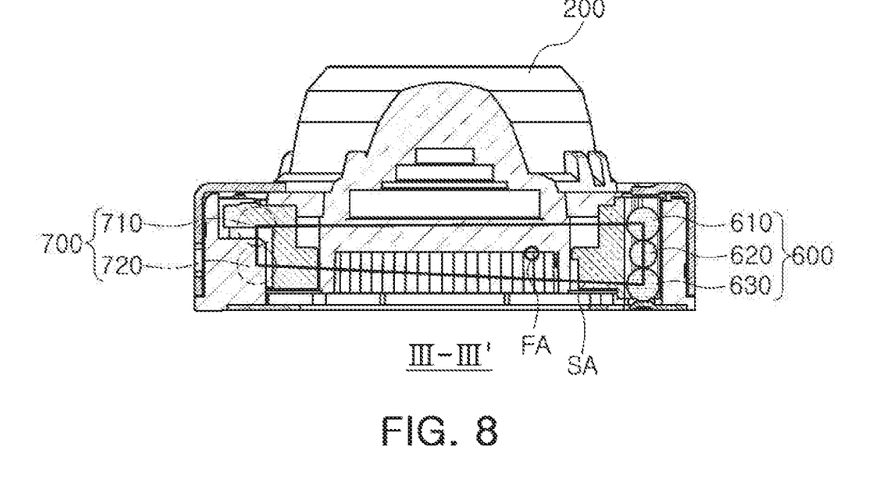
FIG. 8 is a cross-sectional view taken along line III-III' of FIG. 1.
Figure 9:
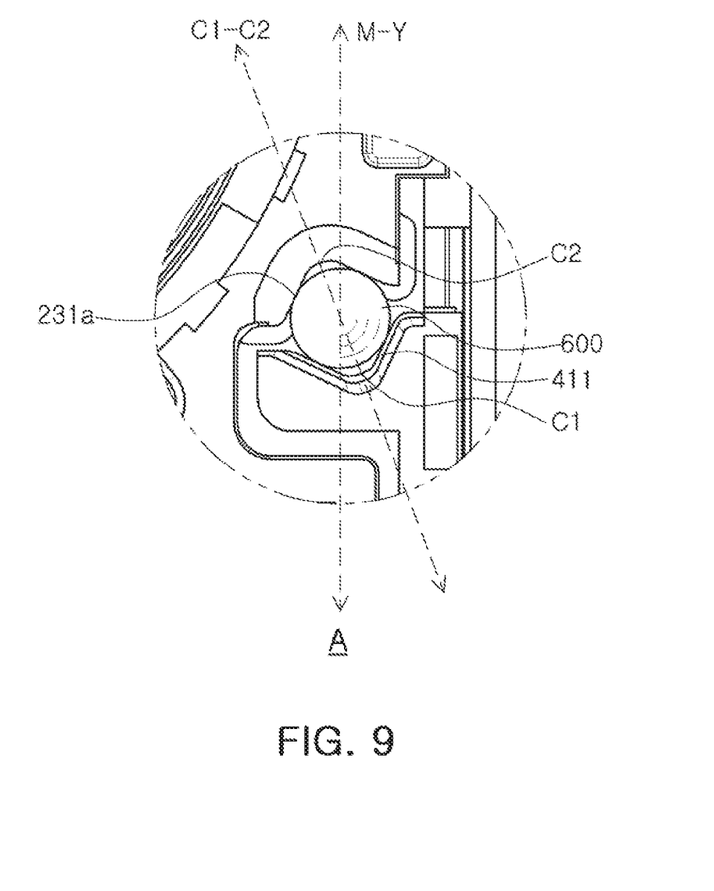
FIG. 9 is an enlarged view of portion A in FIG. 6.

FIG. 6 is a schematic plan view illustrating an example of a camera module, when viewed in an optical axis direction, and FIG. 7 is a view illustrating pressing force applied to a first ball member and a second ball member. FIG. 8 is a cross-sectional view taken along line III-III' of FIG. 1, and FIG. 9 is an enlarged view of portion A in FIG. 6.

In the case of a general camera module, a plurality of ball bearings is disposed respectively on both sides of a magnet. However, in the case of a camera module according to an example disclosed herein, a position in which the first ball member 600 is disposed and a position in which the second ball member 700 is disposed are different from each other with respect to the magnet 310.

Thus, a shortest distance between the first ball member 600 and the magnet 310 and a shortest distance between the second ball member 700 and the magnet 310 are different from each other (see FIG. 6).

In an example, the first ball member 600 is disposed closer to the magnet 310 than the second ball member 700.

Referring to FIGS. 3 to 6, the first ball member 600 is disposed to be adjacent to the magnet 310, and the second ball member 700 is disposed to be spaced apart from the magnet 310 by a predetermined distance.

For example, the first ball member 600 may be disposed to be adjacent to one corner region of the housing 400 or the lens module 200, corresponding to one end of the magnet 310, and the second ball member 700 may be disposed to be adjacent to the other corner region of the housing 400 or the lens module 200. In this case, the other corner region of the housing 400 may indicate a substantially diagonal position with respect to the one corner region of the housing 400 adjacent to the first ball member 600 (see FIG. 6).

Since the first ball member 600 and the second ball member 700 are disposed in a diagonal direction of the housing 400, a shortest distance between the first ball member 600 and the second ball member 700 may be greater than a maximum diameter of the lens barrel 210.

Referring to FIGS. 6 and 7, a line connecting a center of the first ball member 600 and a center of the second ball member 700 may be disposed to have an acute angle (⊖) with respect to the magnet 310.

The first ball member 600 is pressed by an attractive force F between the magnet 310 and the yoke 340. When the first ball member 600 is pressed by the attractive force F, a rotational force may be applied to the lens module 200 about the first ball member 600. In this case, however, since the second ball member 700 is disposed in the other corner region of the housing 400, the lens module 200 may be stably supported by the first ball member 600 and the second ball member 700 without being rotated.

In this case, at least one of a direction of pressing force F1 applied to the first ball member 600 and a direction of pressing force F2 applied to the second ball member 700 is different from a direction of the attractive force F acting between the magnet 310 and the yoke 340.

The directions of the pressing forces F1 and F2 applied to the first ball member 600 and the second ball member 700 may be different from each other.

For example, the direction of the pressing force F1 applied to the first ball member 600 substantially corresponds to the direction of the attractive force F acting between the magnet 310 and the yoke 340, while the direction of the pressing force F2 applied to the second ball member 700 is perpendicular to the direction of the attractive force F acting between the magnet 310 and the yoke 340.

A magnitude of the pressing force F1 applied to the first ball member 600 is greater than a magnitude of the pressing force F2 applied to the second ball member 700.

For example, assuming that the lens module 200 has a square shape when viewed in the optical axis direction, the magnitude of the pressing force F2 applied to the second ball member 700 is about half of the magnitude of the pressing force F1 applied to the first ball member 600.

Although the magnitudes of the pressing forces F1 and F2 applied to the first ball member 600 and the second ball member 700 may be changed depending on a shape of the lens module 200, the magnitude of the pressing force F1 applied to the first ball member 600 may be greater than the magnitude of the pressing force F2 applied to the second ball member 700.

The pressing forces F1 and F2 applied to the first ball member 600 and the second ball member 700 are different from each other, and the directions of the pressing forces F1 and F2 applied to the first ball member 600 and the second ball member 700 are different from each other. Thus, an action point of resultant force FA of the pressing forces F1 and F2 applied to the first ball member 600 and the second ball member 700 may be disposed relatively closer to either of the first ball member 600 and the second ball member 700.

Since the magnitude of the pressing force F1 applied to the first ball member 600 is greater than the magnitude of the pressing force F2 applied to the second ball member 700 in this example, an action point of the resultant force FA of the pressing forces F1 and F2 applied to the first ball member 600 and the second ball member 700 may be disposed closer to the first ball member 600 (see FIG. 7).

Referring to FIGS. 3 to 5, each of the first ball member 600 and the second ball member 700 includes a plurality of balls disposed in the optical axis direction.

For example, in a case in which the sizes of the plurality of balls are all the same, all the balls may contact the lens module 200, so that the lens module 200 may be stably supported. However, it is relatively difficult to physically make the sizes of the plurality of balls completely equal. Thus, even when the sizes of a plurality of balls are all made the same, the sizes of a plurality of balls actually manufactured may be different from each other.

As described above, in the case in which there is a slight difference in the size of the plurality of balls, only a portion of the balls may come into contact with the lens module 200, and thus, tilt may occur when the lens module 200 is moved in the optical axis direction.

To prevent tilt from occurring in a process of moving the lens module 200, the point of action of a resultant force of pressing forces applied to the plurality of balls is required to be located within a support region provided by connecting points of contact between the plurality of balls and the lens module 200.

However, in a case in which only a portion of the plurality of balls contact the lens module 200, it may be difficult to locate the point of action of a resultant force of pressing forces applied to the plurality of balls within a support region connecting points of contact between portions of the plurality of balls and the lens module 200. Thus, there is concern that the lens module 200 may be tilted during movement of the lens module 200.

In the case of a camera module according to an example disclosed herein, a size, for example, a diameter, of a portion of a plurality of balls may be intentionally formed to be greater than a size, for example, a diameter, of remaining balls. In this case, relatively large balls among the plurality of balls may intentionally contact the lens module 200.

For example, the size of uppermost balls and lowermost balls in an optical axis direction, among the plurality of balls, may be greater than the size of balls located between the uppermost and lowermost balls.

Among a plurality of balls of the first ball member 600, an uppermost ball 610 and a lowermost ball 630 disposed in the optical axis direction are greater in size than a ball 620 located between the uppermost ball 610 and the lowermost ball 630 (see FIG. 4).

Among a plurality of balls of the second ball member 700, uppermost and lowermost balls in the optical axis direction are greater in size than a ball located therebetween. Although the second ball member 700 is illustrated in FIG. 5 to include two balls for reference, the second ball member 700 may include three balls in a manner similar to the first ball member 600, and in this case, uppermost and lower balls in the optical axis direction may be greater in size than a ball positioned therebetween.

Thus, among the plurality of balls of the first ball member 600, the uppermost and lowermost balls 610 and 630 in the optical axis direction are in contact with the lens module 200, and among the plurality of balls of the second ball member 700, the uppermost and lowermost balls in the optical axis direction are in contact with the lens module 200, for example, at four support points.

In this case, the support region, connecting the contact point of the first ball member 600 and the lens module 200 and the contact point of the second ball member 700 and the lens module 200, may be formed to have a relatively large region. In an example, the support region may be rectangular (trapezoidal).

Thus, the point of action of a resultant force of pressing forces applied to the first ball member 600 and the second ball member 700 may be positioned within the support region, and thus, tilt may be effectively prevented from occurring during the movement of the lens module 200.

As described above, balls between uppermost and lower balls in the optical axis direction may also have a difference in size due to errors in a manufacturing process.

Thus, the first ball member 600 may be configured in such a manner that the uppermost ball 610 and the lowermost ball 630 in the optical axis direction among the plurality of balls are in contact with the lens module 200, while the second ball member 700 may be configured in such a manner that only one of the uppermost and lowermost balls in the optical axis direction, among the plurality of balls, may be brought into contact with the lens module 200, for example, at three support points.

In this case, a support region connecting contact points of the first ball member 600 and the lens module 200 and a contact point of the second ball member 700 and the lens module 200 may have a triangular shape. Therefore, the support region may be reduced as compared with the case of the four support points.

In this case, however, since the point of action of the resultant force of the pressing forces applied to the first ball member 600 and the second ball member 700 is disposed closer to the first ball member 600, the action point of the resultant force may be located in a relatively large area in a triangular-shaped support region.

Therefore, even in the case in which the support region has a triangular shape, the point of action of the resultant force of the pressing forces applied to the first ball member 600 and the second ball member 700 may be positioned within the support region, thereby effectively preventing the occurrence of tilt in a movement process of the lens module 200.

In another example with reference to FIG. 8, among a plurality of balls of a first ball member 600, uppermost and lowermost balls 610 and 630 in the optical axis direction may be greater in size than a ball located therebetween. Balls 710 and 720 of a second ball member 700 may have sizes corresponding (relatively equal) to each other.

In this case, the number of the plurality of balls of the first ball member 600 is greater than the number of the plurality of balls of the second ball member 700. For example, the first ball member 600 may include three balls in total, and the second ball member 700 may include two balls in total.

In this case, a support region SA is formed to have a trapezoidal shape or a triangular shape, and an action point of resultant force FA of pressing forces F1 or F2 applied to the first ball member 600 and the second ball member 700 is positioned closer to the first ball member 600. Thus, the action point of the resultant force FA may be positioned in a relatively great area in the support region SA in any cases.

Referring to FIG. 6, the housing 400 includes a first receiving groove 411 and a second receiving groove 421, and the lens module 200 includes a third receiving groove 231a and a fourth receiving groove 232a.

The first receiving groove 411 and the third receiving groove 231a are disposed to face each other, and the second receiving groove 421 and the fourth receiving groove 232a are disposed to face each other.

The first ball member 600 is disposed between the first receiving groove 411 and the third receiving groove 231a, and the second ball member 700 is disposed between the second receiving groove 421 and the fourth receiving groove 232a.

The first receiving groove 411, the second receiving groove 421 and the third receiving groove 231a have a substantially "V"-shaped section, and the fourth receiving groove 232a has a substantially "]"-shaped section.

Thus, the first ball member 600 may be in two-point contact with the first receiving groove 411, and may be in two-point contact with the third receiving groove 231a. The second ball member 700 may be in two-point contact with the second receiving groove 421, and may be in one-point contact with the fourth receiving groove 232a.

For example, the first ball member 600 is in four-point contact with an object, and the second ball member 700 is in three-point contact with the object.

The first ball member 600, which is received in a space between the first receiving groove 411 and the third receiving groove 231a, may function as a main guide, and the second ball member 700, which is received in a space between the second receiving groove 421 and the fourth receiving groove 232a, may function as an auxiliary guide.

In this case, direction C1-C2 in which center C1 of the first receiving groove 411 and center C2 of the third receiving groove 231a face each other, as viewed in the optical axis direction, is inclined with respect to direction M-Y in which the magnet 310 and the yoke 340 face each other (see FIG. 9).

The resultant force FA of the pressing forces F1 and F2 applied to the first ball member 600 and the second ball member 700 is inclined with respect to the direction of the attractive force F acting between the magnet 310 and the yoke 340, for example, with respect to a direction in which the magnet 310 and the yoke 340 face each other (see FIG. 7). The point of action of the resultant force FA of the pressing forces F1 and F2 applied to the first ball member 600 and the second ball member 700 is located relatively closer to the first ball member 600.

Thus, as the direction in which the first receiving groove 411 and the third receiving groove 231a, in which the first ball member 600 is disposed, face each other, is inclined with respect to the direction in which the magnet 310 and the yoke 340 face each other, the lens module 200 may be more stably supported.

Referring to FIG. 6, the housing 400 is provided with a first guide protrusion 410 and a second guide protrusion 420, protruding toward the lens module 200, and the lens module 200 is provided with a first guide groove 231 into which the first guide protrusion 410 is inserted, and a second guide groove 232 into which the second guide protrusion 420 is inserted.

The first receiving groove 411 and the third receiving groove 231a are provided in surfaces of the first guide protrusion 410 and the first guide groove 231 facing each other. For example, the first receiving groove 411 is formed in the first guide protrusion 410, and the third receiving groove 231a is formed in the first guide groove 231.

The second receiving groove 421 and the fourth receiving groove 232a are provided in surfaces of the second guide protrusion 420 and the second guide groove 232 facing each other. For example, the second receiving groove 421 is formed in the second guide protrusion 420, and the fourth receiving groove 232a is formed in the second guide groove 232.

In this case, the first guide protrusion 410 and the first guide groove 231 may be located behind the magnet 310. A rear side of the magnet 310 may indicate a direction, from a surface on which the magnet 310 is mounted on the lens module 200, to an optical axis. In an example, a distance between the magnet 310 and the yoke 340 is smaller than a distance between the first guide protrusion 410 and the first guide groove 231 and a distance between the first guide protrusion 410 and the yoke 340.

Since the first ball member 600 is disposed between the first receiving groove 411 and the third receiving groove 231a, the first ball member 600 may be disposed behind the magnet 310.

Thus, the size of the magnet 310 mounted on one surface of the lens module 200 may be increased, thereby securing sufficient driving force required for focus adjustment even when the camera module is miniaturized.

In the camera module of the above-described examples, tilt may be prevented from occurring when a lens module is moved in an optical axis direction.

As set forth above, a camera module according to the examples may prevent tilt from occurring when a lens module is moved in an optical axis direction.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects of the present disclosure in each example are to be considered as being applicable to similar features or aspects of the present disclosure in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing accommodating a lens module;
a driving unit comprising a magnet disposed on the lens module and a coil disposed to face the magnet;
a yoke configured to generate attractive force with the magnet;
a first ball member disposed between the lens module and the housing, and pressed by a first pressing force as a result of the attractive force; and
a second ball member disposed between the lens module and the housing, and pressed by a second pressing force as a result of the attractive force,
wherein a direction of the first pressing force is different than a direction of the second pressing force, and
a point of action of a resultant force of the first pressing force and the second pressing force is located closer to one of the first ball member and the second ball member than the other of the first ball member and the second ball member.

2. The camera module of claim 1, wherein a shortest distance between the first ball member and the magnet is different than a shortest distance between the second ball member and the magnet.

3. The camera module of claim 1, wherein the lens module comprises a lens barrel including a lens and a carrier receiving the lens barrel, and
a shortest distance between the first ball member and the second ball member is greater than a maximum diameter of the lens barrel.

4. The camera module of claim 1, wherein the first ball member comprises first balls disposed in an optical axis direction and the second ball member comprises second balls disposed in the optical axis direction, at least two of the first balls have differing sizes, and at least two of the second balls have differing sizes.

5. The camera module of claim 4, wherein an uppermost ball and a lowermost ball in the optical axis direction, among the first balls, are greater in size than at least one ball located between the uppermost ball and the lowermost ball.

6. The camera module of claim 1, wherein the first ball member comprises first balls disposed in an optical axis direction and the second ball member comprises second balls disposed in the optical axis direction,
wherein an uppermost ball and a lowermost ball in the optical axis direction, among the first balls, are greater in size than at least one ball located between the uppermost ball and the lowermost ball, and
the second balls have sizes corresponding to each other.

7. The camera module of claim 6, wherein a number of the first balls is greater than a number of the second balls.

8. The camera module of claim 1, wherein the first ball member is disposed closer to the magnet than the second ball member, and
the point of action of the resultant force is located closer to the first ball member than the second ball member.

9. The camera module of claim 8, wherein the housing comprises a first receiving groove and a second receiving groove, and the lens module comprises a third receiving groove and a fourth receiving groove;
the first ball member is disposed between the first receiving groove and the third receiving groove, and the second ball member is disposed between the second receiving groove and the fourth receiving groove; and
a direction, in which a center of the first receiving groove and a center of the third receiving groove face each other, is inclined with respect to a direction in which the magnet and the yoke face each other, when viewed in an optical axis direction.

10. The camera module of claim 9, wherein the housing comprises first and second guide protrusions protruding toward the lens module, and the lens module comprises first and second guide grooves into which the first and second guide protrusions are respectively inserted;

the first receiving groove and the third receiving groove are respectively provided in surfaces of the first guide protrusion and the first guide groove facing each other; and the second receiving groove and the fourth receiving groove are respectively provided in surfaces of the second guide protrusion and the second guide groove facing each other.

11. The camera module of claim 1, wherein the direction of the first pressing force is perpendicular to the direction of the second pressing force.

12. The camera module of claim 1, wherein the first ball member is disposed adjacent a first corner of the housing and the second ball member is disposed adjacent to a second corner of the housing that is diagonal to the first corner.

13. A camera module comprising:
a housing accommodating a lens module;
a driving unit comprising a magnet disposed on the lens module and a coil disposed to face the magnet;
a yoke configured to generate attractive force with the magnet; and
a first ball member disposed between the lens module and the housing, and pressed by the attractive force; and
a second ball member disposed between the lens module and the housing, and pressed by the attractive force,
wherein the first ball member is closer to the magnet than the second ball member, and
the first ball member and the second ball member are disposed such that a line connecting a center of the first ball member and a center of the second ball member has an acute angle with respect to the magnet.

14. The camera module of claim 13, wherein a direction of a pressing force applied to the first ball member is different than a direction of a pressing force applied to the second ball member.

15. The camera module of claim 14, wherein at least one of the direction of the pressing force applied to the first ball member and the direction of the pressing force applied to the second ball member is different than a direction of the attractive force generated between the magnet and the yoke.

16. The camera module of claim 14, wherein a point of action of a resultant force of the pressing forces applied to the first ball member and the second ball member is located closer to the first ball member than the second ball member.

17. The camera module of claim 13, wherein the pressing force applied to the first ball member is greater than the pressing force applied to the second ball member.

18. The camera module of claim 13, wherein the first ball member comprises first balls disposed in an optical axis direction and the second ball member comprises second balls disposed in the optical axis direction,
wherein an uppermost ball and a lowermost ball in the optical axis direction, among the first balls, are greater in size than at least one ball located between the uppermost ball and the lowermost ball, and the second balls have sizes corresponding to each other, and
a number of the first balls is greater than a number of the second balls.

19. The camera module of claim 9, wherein the first ball member is in two-point contact with the first receiving groove and the third receiving groove, and the second ball member is in two-point contact with the second receiving groove and is in one-point contact with the fourth receiving groove.

20. A camera module comprising:
a housing;
a lens module accommodated in the housing;
a driving unit comprising a magnet disposed on the lens module and a coil disposed to face the magnet;
a yoke configured to generate attractive force with the magnet;
a first ball member disposed between the lens module and the housing, and pressed by a first pressing force as a result of the attractive force such that the first ball member maintains contact with the lens module and the housing; and
a second ball member disposed between the lens module and the housing, and pressed by a second pressing force as a result of the attractive force such that the second ball member maintains contact with the lens module and the housing,
wherein a direction of the first pressing force is different than a direction of the second pressing force, and
a point of action of a resultant force of the first pressing force and the second pressing force is located closer to one of the first ball member and the second ball member than the other of the first ball member and the second ball member.

* * * * *